United States Patent [19]

Wheeler

[11] Patent Number: 5,054,740
[45] Date of Patent: Oct. 8, 1991

[54] AIR COMPRESSOR TANK MOUNT

[75] Inventor: Roger D. Wheeler, Jackson, Tenn.

[73] Assignee: DeVilbiss Air Power Company, Jackson, Tenn.

[21] Appl. No.: 591,082

[22] Filed: Oct. 1, 1990

[51] Int. Cl.⁵ .............................................. F16M 3/00
[52] U.S. Cl. ................................... 248/675; 248/154
[58] Field of Search .............. 248/674, 675, 676, 671, 248/689, 690, 129, 145.6, 121, 154, 903, 223.4, 680, 500; 206/319

[56] References Cited

U.S. PATENT DOCUMENTS

| | | | |
|---|---|---|---|
| 2,414,506 | 1/1947 | Bowen | 248/676 X |
| 2,579,639 | 12/1951 | Adams | 248/129 X |
| 2,661,172 | 12/1953 | Needham | 248/671 |
| 3,022,969 | 2/1962 | Fleckenstein et al. | 248/671 X |
| 3,887,289 | 6/1975 | Smart | 248/223.4 X |
| 4,739,209 | 4/1988 | Sieber | 248/676 X |
| 4,778,421 | 10/1988 | Greenberg | 248/671 X |
| 4,971,286 | 11/1990 | Silhan | 248/129 X |

FOREIGN PATENT DOCUMENTS

| | | | |
|---|---|---|---|
| 0686467 | 1/1940 | Fed. Rep. of Germany | 248/671 |
| 0767060 | 7/1934 | France | 248/671 |

*Primary Examiner*—Ramon O. Ramirez
*Attorney, Agent, or Firm*—MacMillan, Sobanski & Todd

[57] ABSTRACT

An improved air compressor tank mount. Grooves are formed along opposite sides of the bottom of the air compressor housing. Two brackets are welded to the top of the air tank. Each bracket has two upwardly and inwardly facing hooked ends which are spaced to engage the air compressor housing grooves. The air compressor slides onto the hooked bracket ends until one or more bracket end abuts a flange and the compressor may be retained on the brackets by a single screw.

13 Claims, 3 Drawing Sheets

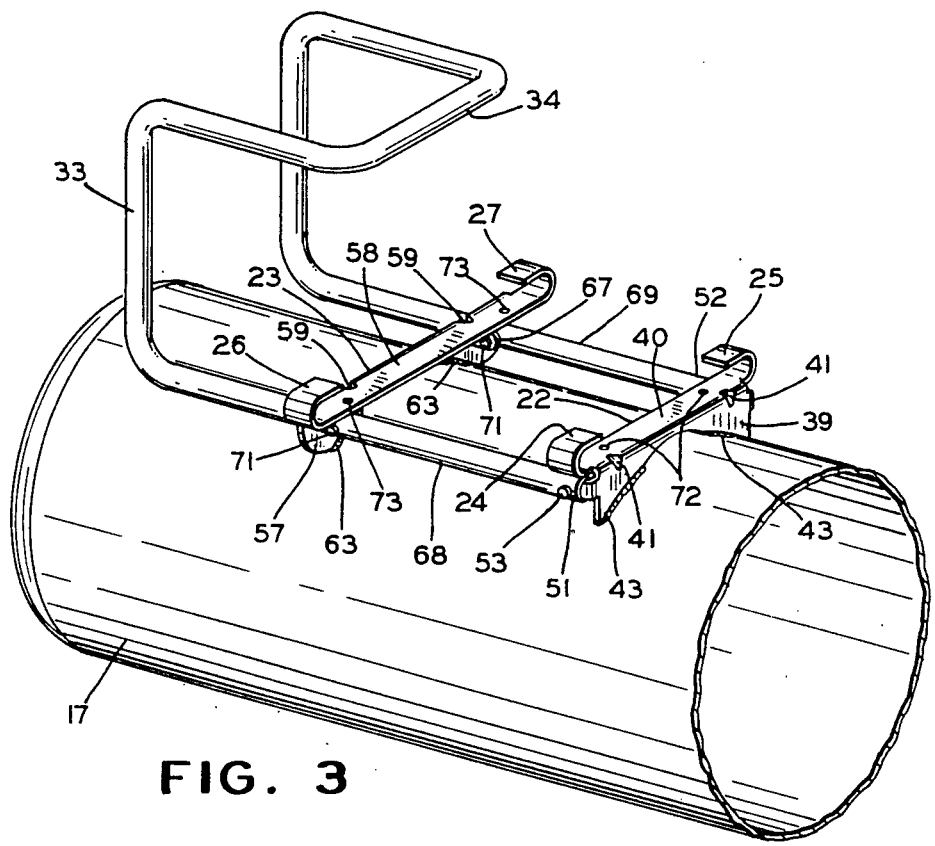
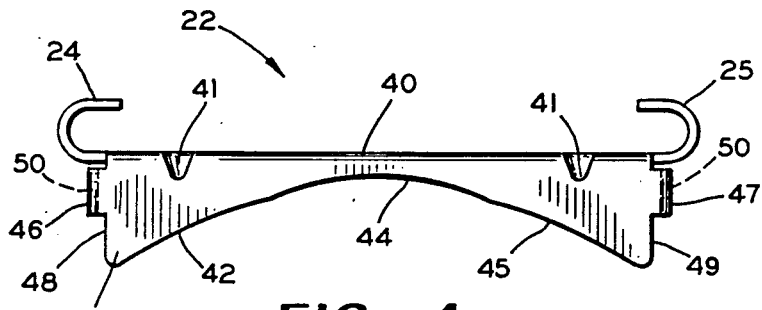
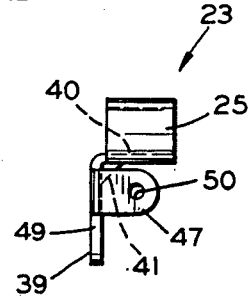
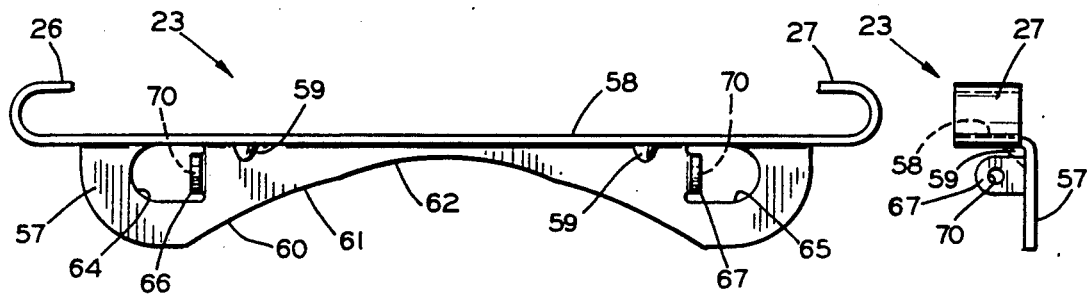
FIG. 3
FIG. 4
FIG. 5
FIG. 6
FIG. 7

AIR COMPRESSOR TANK MOUNT

TECHNICAL FIELD

The invention relates to air compressors and more particularly to an improved mount for attaching an air compressor and motor to a compressed air storage tank.

BACKGROUND ART

Small portable air compressors are used in many ways. They provide compressed air for operating, for example, spray guns, dusting nozzles, grit blasters and pneumatic tools and for inflating tires. For light duty applications where only low air flow is required and where constant air pressure is not required, air may be delivered directly from the compressor to a tool or to fill a tire, for example. However, where more uniform air pressure is needed or where an application periodically requires greater air flow at a desired pressure than the compressor is capable of delivering, the compressor is connected to fill a compressed air storage tank to a desired high pressure and compressed air is used from the tank.

Air compressors and compressed air storage tanks are often sold as assemblies. A base is frequently welded to the air storage tank. An air compressor and an electric motor which drives the air compressor are designed to be mounted on the tank by bolting to the base. Where an air compressor and motor are manufactured as a compact stand alone assembly without an air tank, there is no convenient way to subsequently mount the assembly on a compressed air storage tank.

DISCLOSURE OF INVENTION

The invention is directed to an improved mount for attaching a compact compressor and electric drive motor assembly to a compressed air storage tank. Two mounting brackets are welded to the compressed air storage tank. Each bracket has a saddle which preferably is contoured with two or more radii to permit use of the brackets with two or more different diameter cylindrical air tanks. Each bracket has two opposed ends which form inwardly directed hooks. The compressor and motor are mounted in a compact case which includes integral slots located for sliding onto the hooked bracket ends. Once the compressor assembly is positioned on the hooked mounting bracket ends, one or more screws can be attached to the compressor assembly to retain the assembly on the compressed air storage tank.

The mounting brackets on the air tank are formed to receive an optional handle. When the handle is attached to the mounting brackets, it may extend over the compressor assembly to approximately the center of gravity of the tank and attached compressor assembly to facilitate carrying the compressor and air tank. Or, if the air tank is provided with wheels at one end, the handle may extend from an opposite end for lifting and wheeling the compressor and air tank.

Accordingly, it is an object of the invention to provide an improved mount for attaching a compressor and motor assembly to a compressed air storage tank.

Other objects and advantages of the invention will be apparent from the following detailed description and the accompanying drawings

BRIEF DESCRIPTION OF THE DRAWINGS

FIG. 3 is an enlarged fragmentary perspective view showing a portion of the air storage tank, the attached mounting brackets and the handle with the air compressor and motor assembly removed;

FIG. 4 is a side elevational view of one of the mounting brackets;

FIG. 5 is an end view of the mounting bracket of FIG. 4;

FIG. 6 is a side elevational view of the other of the mounting brackets;

FIG. 7 is an end view of the mounting bracket of FIG. 6;

BEST MODE FOR CARRYING OUT THE INVENTION

Figure 1:
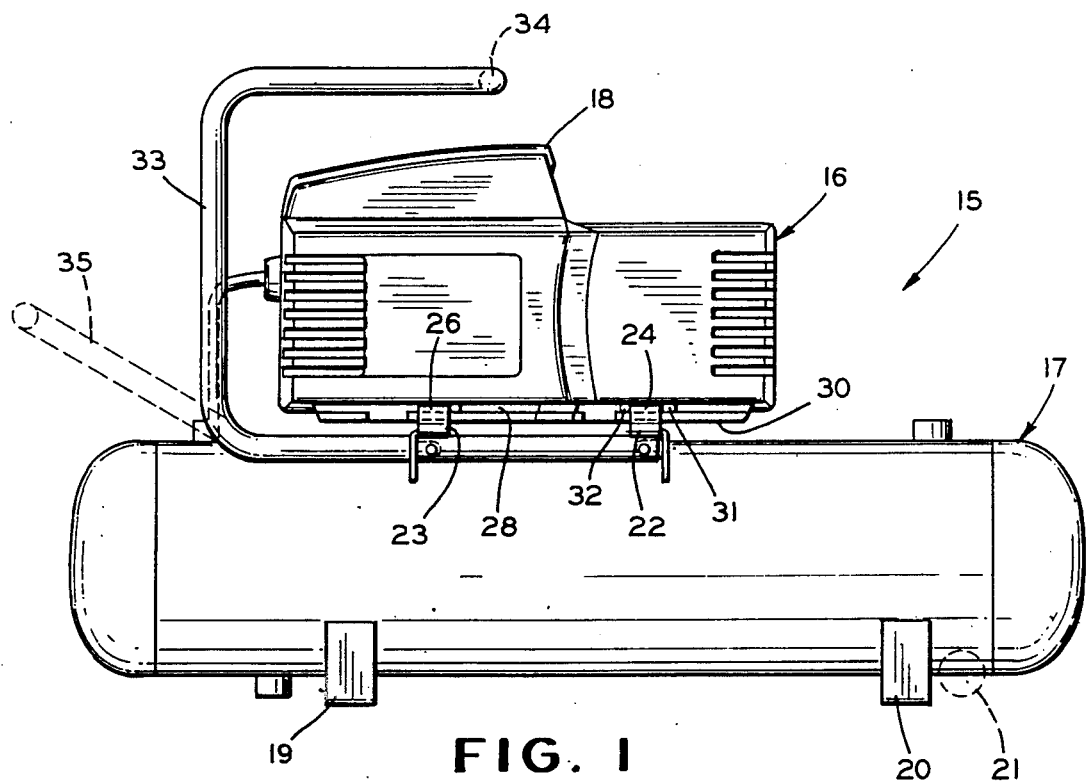
FIG. 1 is a side elevational view showing a compact air and motor assembly mounted on an air storage tank according to the invention.
Figure 2:
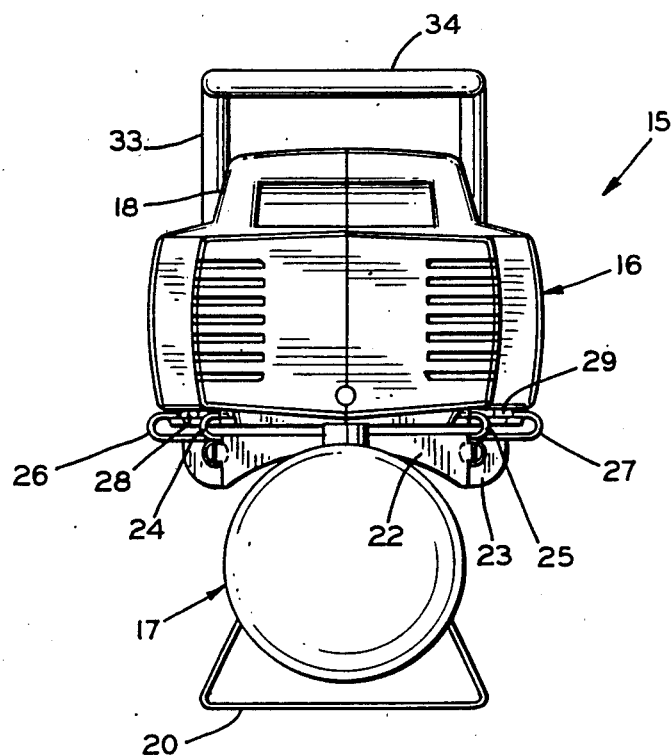
FIG. 2 is an end view thereof.

Referring to FIGS. 1 and 2 of the drawings, a portable air compressor assembly 15 is shown in accordance with a preferred embodiment of the invention. The assembly 15 consists of an air compressor 16 mounted on a compressed air storage tank 17. The air compressor 16 is illustrated as having a compact molded plastic housing 18 in which a reciprocating piston compressor and an electric motor (not shown) are mounted. The air tank 17 is cylindrical and is shown supported in a horizontal position by a pair of leg brackets 19 and 20 welded to the tank 17. Or, one of the leg brackets 20 may be replaced with a pair of wheels 21 to make the assembly 15 mobile.

A pair of brackets 22 and 23 are welded to the top of the tank 17 for mounting the compressor 16. The bracket 22 has two opposed upwardly and inwardly hooked ends 24 and 25 and the bracket 23 has two opposed upwardly and inwardly hooked ends 26 and 27. The air compressor housing 18 is formed with integral grooves 28 and 29 extending along opposite sides of its bottom 30. The grooves 28 and 29 are spaced and sized to slide onto the hooked bracket ends 24–27 for mounting the air compressor 16 on the air storage tank 17. When the air compressor 16 is secured to the brackets 22 and 23, the bracket ends 24 and 26 are retained in the housing groove 28 and the bracket ends 25 and 27 are retained in the housing groove 29. The air compressor slides onto the brackets 22 and 23 until one or more of the hooked ends 26 abuts a flange 31 or other suitable stop. A screw 32 is then threaded into the housing 18 to retain the air compressor 16 on the tank mounting brackets 22 and 23.

A tubular handle 33 may be attached to the brackets 22 and 23 to facilitate either carrying the assembly 15 or, when wheels 21 are mounted on the tank, to facilitate wheeling the air compressor assembly 15. The illustrated handle 33 is designed for carrying the air compressor assembly 15 and includes a looped portion 34 which preferably extends above the center of gravity of the air storage tank 17 and the attached air compressor 16. When the tank 17 is provided with wheels 21, the handle may have a looped portion 35 (dashed lines)

overhanging an end 36 of the tank 17 opposite the end to which the wheels 21 are mounted.

Referring to FIGS. 3-5, the bracket 22 is shown in detail. The bracket 22 may be stamped and formed from a sheet of steel or other suitable material. The bracket 22 is shaped with a generally vertical saddle portion 39 and a generally horizontal portion 40. Gussets 41 may be stamped between the saddle portion 39 and the horizontal portion 40 to increase the rigidity of the bracket 22. The saddle portion 39 has a curved lower edge 42 having a diameter for abutting the air tank 17. The saddle portion 39 is attached to the air tank 17 with a weldment 43. Preferably, the curved lower saddle edge 42 has two or more different diameter portions. By locating, for example, a smaller diameter portions 44 at the center of a larger diameter portion 45, the bracket 22 may be used with either of two different diameter air storage tanks 17. The opposed hooked ends 24 and 25 are formed from the horizontal portion 40 of the bracket 22. The hooked ends 24 and 25 may be covered with a suitable resilient material such as a vinyl to prevent scratching the air compressor 16 when it is attached to and removed from the air tank 17 and to reduce vibrations.

Two tabs 46 and 47 are formed at opposite edges 48 and 49, respectively, of the saddle portion 39. The tabs are bent inwardly to extend parallel to one another under the horizontal portion 40. A screw bolt hole 50 is formed in each tab 46 and 47. The tabs 46 and 47 are spaced for attachment to open ends 51 and 52 on the tubular handle 33. Screws or bolts 53 are secured through the handle 33 and the holes 50 for attaching the handle ends 51 and 52 to the bracket 22. The tabs 46 and 47 may extend into (as illustrated) or may be positioned next to the attached handle ends 51 and 52.

The bracket 23 is shown in detail in FIGS. 3, 6 and 7. The bracket 23 includes a vertical saddle portion 57, a horizontal portion 58 and one or more reinforcement gussets 59 formed at the bend between the portions 57 and 58. The saddle portion 57 has a curved lower edge 60 which may be formed with one or more curvatures (two curvatures 61 and 62 illustrated) for securing the bracket 23 to air storage tanks 17 of a predetermined diameter or for securing the bracket 23 to any of two or more air storage tanks having different diameters. The lower saddle portion edge 60 is attached to the air tank 17 with weldments 63.

The hooked ends 26 and 27 are formed from opposing ends of the horizontal portion 58 to extend above the horizontal portion 58 and to open inwardly towards each other. If desired, the hooked ends 26 and 27 may be coated with vinyl, for example, to protect the air compressor housing 18 and to reduce vibrations and noise during operation of the air compressor 16.

Two holes 64 and 65 are formed in the saddle portion 57. The holes 64 and 65 are sized and spaced to pass the free ends 51 and 52 of the handle 33. Tabs 66 and 67 are bent from sides of the holes 64 and 65, respectively, to extend parallel to each other and to abut sides 68 and 69 of the handle 33. A hole 70 is formed in each tab 66 and 67. Bolts or screws 71 are passed through each handle side 68 and 69 and the adjacent tab hole 70 for securing the handle sides 68 and 69 to the bracket 23.

As is illustrated in FIG. 3, two spaced holes 72 are formed in the horizontal portion 40 of the bracket 22 and two spaced holes 73 are formed in the horizontal portion 58 of the bracket 23. A suitable jig (not shown) is secured to the holes 72 and 73 to position the brackets 22 and 23 relative to each other while applying the weldments 43 and 63. This assures that the horizontal portions 40 and 58 are coplanar and horizontal, that the brackets 22 and 23 are spaced a desired distance apart and that the brackets 22 and 23 are attached to extend perpendicular to the axis of the air storage tank 17 when the weldments 43 and 63 are applied.

Figure 8:
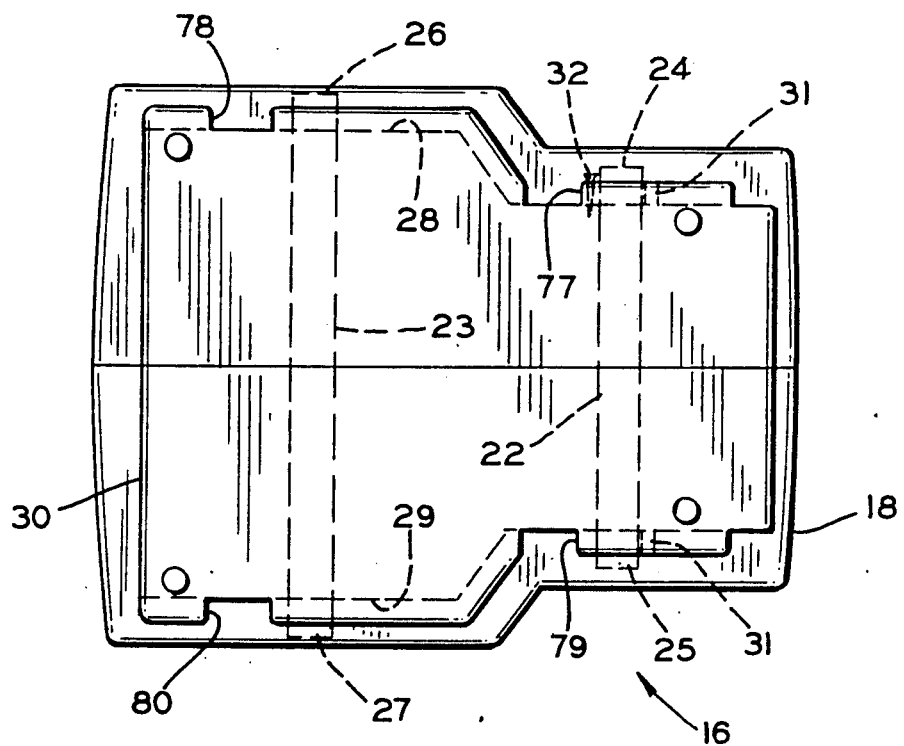
FIG. 8 is a bottom plan view of an air compressor and motor showing grooves for attachment to the mounting brackets.
Figure 9:
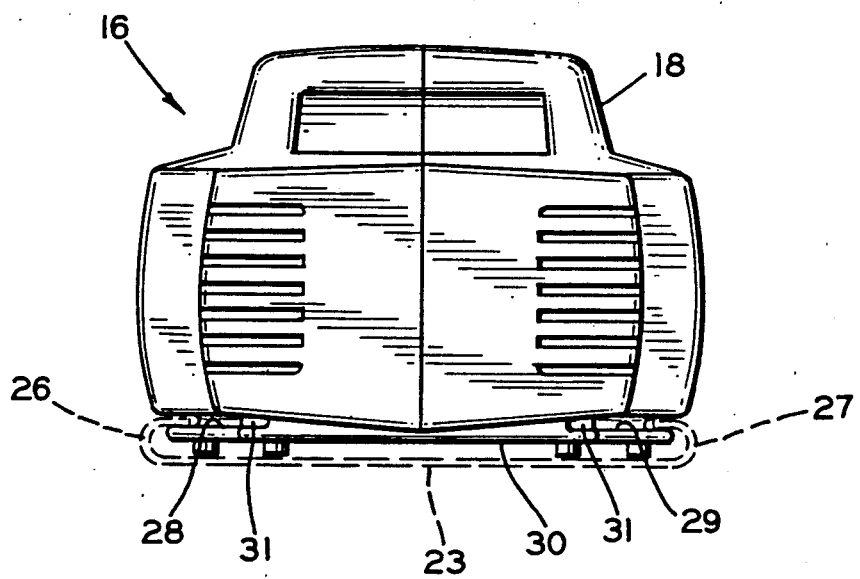
FIG. 9 is an end view of the compressor and motor assembly of FIG. 8.

FIGS. 8 and 9 show details of the air compressor housing bottom 30 and the adjacent grooves 28 and 29. Two notches 77 and 78 are formed in the bottom 30 to open into the groove 28 and two notches 79 and 80 are formed in the bottom 30 to open into the groove 29. The notches 77 and 78 are spaced apart by the same distance that the hooked ends 24 and 26 on the brackets 22 and 23 are spaced apart. The notches 79 and 80 are spaced apart by the same distance that the hooked ends 25 and 27 on the brackets 22 and 23 are spaced apart. The notches 77 and 79 allow the hooked ends 24 and 25 on the bracket 22 to enter the grooves 28 and 29, respectively, and, at the same time, the notches 78 and 80 allow the hooked ends 26 and 27 on the bracket 23 to enter the grooves 28 and 29, respectively. After the hooked ends 24-27 are inserted into the notches 77-80, respectively, the air compressor housing 18 is moved horizontally until the hooked ends 24 and 25 abut the flanges 31 or other suitable stop which blocks one or both of the grooves 28 and 29. The screw 32 then is secured to the housing 18 to retain the housing 18 on the air tank brackets 22 and 23.

The mounting brackets 22 and 23 have several advantages for attaching an air compressor to an air storage tank. The design allows the brackets 22 and 23 to be welded to air tanks 17 of different diameters. The design also provides a secure low cost air compressor mount that offers both easy assembly and easy air compressor removal for service, and offers effective vibration isolation. Only a single fastener is required to attach the compressor to the tank.

It will be appreciated that various modifications and changes may be made in the above described preferred embodiment of an air compressor tank mount. For example, according to the broadest aspects of the invention, the specific design of the housing grooves 28 and 29 and of the hooked bracket ends 24-27 may be varied to accomplish the desired function of providing a mount in which an air compressor may slide onto a mount attached to an air storage tank. Various other modifications and changes will be apparent to those skilled in the art without departing from the spirit and the scope of the following claims.

What is claimed is:

1. In combination with an air compressor and a compressed air storage tank, a mount for releasably attaching said air compressor to said air tank, said mount comprising first and second brackets, each of said brackets having a saddle portion with an edge shaped to abut said air tank, weldments attaching said bracket edges to said air tank with said brackets spaced apart, said first bracket having first and second hooked ends, said second bracket having third and fourth hooked ends, said air compressor having a bottom and first and second opposed spaced grooves formed adjacent said bottom with said grooves spaced for said first groove receiving said first and third hooked bracket ends and said second groove simultaneously receiving said second and fourth hooked bracket ends, and means for retaining said hooked bracket ends in said grooves.

2. A mount for releasably attaching an air compressor to a compressed air storage tank, as set forth in claim 1, wherein said air compressor has a molded plastic housing, and wherein said grooves are integrally formed in said air compressor housing.

3. A mount for releasably attaching an air compressor to a compressed air storage tank, as set forth in claim 1, wherein said brackets have coplanar portions and wherein said hooked ends of each bracket extend from opposite ends of said coplanar portion of such bracket.

4. A mount for releasably attaching an air compressor to a compressed air storage tank, as set forth in claim 3, and further including a vinyl coating on each of said hooked ends.

5. A mount for releasably attaching an air compressor to a compressed air storage tank, as set forth in claim 3, wherein each of said brackets is formed from a single stamped sheet of material, wherein said coplanar portion of a bracket is bent relative to said saddle portion for such bracket, and wherein each bracket includes at least one reinforcement gusset formed between said coplanar portion and said saddle portion for such bracket.

6. A mount for releasably attaching an air compressor to a compressed air storage tank, as set forth in claim 1, and further including a handle formed from a bent tube, said handle having two spaced free ends, said free ends of said handle extending through two spaced holes in said second bracket, and means securing said free ends of said handle to said first bracket.

7. A mount for releasably attaching an air compressor to a compressed air storage tank, as set forth in claim 6, wherein said first bracket has a pair of spaced tabs, and wherein said means securing said free ends of said handle to said first bracket comprises two bolts, each of said bolts attaching a free handle end to one of said tabs.

8. A mount for releasably attaching an air compressor to a compressed air storage tank, as set forth in claim 7, wherein said second bracket has a tab formed adjacent each of said spaced holes, and means securing said handle to said second bracket including bolts attaching said handle to each second bracket tab.

9. A mount for releasably attaching an air compressor to a compressed air storage tank, as set forth in claim 6, wherein said handle has a loop portion extending above the center of gravity of said air compressor and attached air tank to facilitate carrying said air compressor and tank.

10. A mount for releasably attaching an air compressor to a compressed air storage tank, as set forth in claim 6, wherein said air storage tank is cylindrical and has first and second ends with wheels attached to said first tank end, and wherein said handle has a loop portion extending past said second tank end to facilitate moving said air compressor and attached tank with said wheels.

11. A mount for releasably attaching an air compressor to a compressed air storage tank, as set forth in claim 1, wherein said saddle portion edge of each bracket has a first portion of a radius for abutting an air tank having a predetermined small diameter, and a second portion extending on opposite sides of said first portion, said second portion having a radius for abutting an air tank having a predetermined diameter larger than said small diameter.

12. In combination with an air compressor and a compressed air storage tank, a mount for releasably attaching said air compressor to said air tank said mount comprising first and second brackets, each of said brackets having a saddle portion with an edge shaped to abut said air tank, weldments attaching said bracket edges to said air tank with said brackets spaced apart, said first bracket having first and second hooked ends, said second bracket having third and fourth hooked ends, said air compressor having a bottom and first and second opposed spaced grooves formed adjacent said bottom with said grooves spaced for said first groove receiving said first and third hooked bracket ends and said second groove simultaneously receiving said second and fourth hooked bracket ends, and means for retaining said hooked bracket ends in said grooves including a flange blocking at least one of said first and second grooves, one of said hooked bracket ends abutting said flange, and a screw engaging said air compressor, said screw and said flange retaining said hooked bracket ends in said grooves.

13. A mount for releasably attaching an air compressor to a compressed air storage tank, as set forth in claim 1, wherein said first and second hooked ends face each other and have a predetermined spacing and wherein said third and fourth hooked bracket ends face each other and have a predetermined spacing.

* * * * *